(12) United States Patent
Jones et al.

(10) Patent No.: US 6,757,241 B1
(45) Date of Patent: *Jun. 29, 2004

(54) SYSTEM FOR INTERFERENCE CANCELLATION

(75) Inventors: Vincent K. Jones, Redwood Shores, CA (US); Gregory G. Raleigh, El Granada, CA (US); Derek Gerlach, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/187,405

(22) Filed: Jun. 28, 2002

Related U.S. Application Data

(63) Continuation of application No. 09/234,629, filed on Jan. 21, 1999, now Pat. No. 6,442,130.

(51) Int. Cl.[7] .................................................. H04J 11/00
(52) U.S. Cl. ....................... 370/208; 370/210; 375/347
(58) Field of Search ................................ 370/203, 208, 370/210, 343; 375/147, 148, 267, 316, 346, 347; 455/132, 133, 134, 135

(56) References Cited

U.S. PATENT DOCUMENTS

| | | | |
|---|---|---|---|
| 5,528,581 A | 6/1996 | De Bot | |
| 5,644,603 A | 7/1997 | Ushirokawa | 375/341 |
| 5,682,376 A | * 10/1997 | Hayashino et al. | 370/206 |
| 5,790,550 A | * 8/1998 | Peeters et al. | 370/480 |
| 5,862,182 A | * 1/1999 | Awater et al. | 375/279 |
| 5,901,187 A | 5/1999 | Iinuma | 375/347 |
| 5,923,666 A | 7/1999 | Gledhill et al. | 370/480 |
| 5,966,401 A | 10/1999 | Kumar | 375/200 |
| 6,118,832 A | 9/2000 | Mayrargue et al. | 375/346 |
| 6,125,109 A | 9/2000 | Fuerter | 370/315 |
| 6,144,710 A | 11/2000 | Chen et al. | 375/346 |
| 6,282,168 B1 | 8/2001 | Vijayan et al. | 370/203 |

FOREIGN PATENT DOCUMENTS

| WO | WO 98/09385 | 8/1996 | H04B/7/02 |
|---|---|---|---|
| WO | WO 98/18271 | 4/1998 | H04Q/7/00 |

* cited by examiner

Primary Examiner—Ajit Patel
(74) Attorney, Agent, or Firm—Ritter, Lang & Kaplan LLP

(57) ABSTRACT

A spatial processor that exploits signals that arrive via multiple outputs of a communication channel to provide soft decision values useful to a trellis or Viterbi decoder. A spatial processor may take into account a statistical characterization of interference as received via the multiple channel outputs. Spatial processor operation may also be optimized to operate in conjunction with orthogonal frequency division multiplexing (OFDM).

16 Claims, 3 Drawing Sheets

SYSTEM FOR INTERFERENCE CANCELLATION

This application is a continuation of application Ser. No. 09/234,629, filed Jan. 21, 1999, now U.S. Pat. No. 6,442,130.

BACKGROUND OF THE INVENTION

The present invention relates to digital communication systems and more particularly to systems and methods for exploiting multiple antennas or other channel outputs to exploit spatial diversity and ameliorate the effects of interference.

It is known to use adaptive spatial processing to exploit multiple antenna arrays to increase the communication quality of wireless systems. A weighting among antennas is chosen based on content of the signals received via multiple antenna elements. The spatial processor selects a weighting that optimizes reception of a desired signal.

In some systems, the spatial processor estimates a weighting based in part on statistical characterization of an interference source. The spatial processor selects the weighting to maximize the signal to interference plus noise ratio (SINR). Examples of such systems are described in PCT Pub. No. 98/18271, the contents of which are incorporated herein by reference.

In these systems, the weighting becomes a basis for a maximum likelihood solution for estimating transmitted symbols. The output of the spatial processor is a so-called "hard decision" of the most likely transmitted symbol. It would be desirable, however, to combine trellis codes with the use of this type of spatial processing at the receiver because trellis codes provide excellent bit error rate performance with minimal addition of redundant information. A trellis decoder or Viterbi decoder would then be used to remove the effects of the trellis coding. Rather than a "hard decision," the trellis or Viterbi decoder requires as input likelihood or so-called "cost metric" values corresponding to different values of each transmitted symbol. These cost metric values are also referred to as "soft decision" values. It would be desirable to optimize spatial processing techniques to efficiently provide "soft decision" values as output rather than "hard decision" values.

OFDM (Orthogonal Frequency Division Multiplexing) is another highly useful communication technique. In OFDM, the available bandwidth is divided into subchannels that are orthogonal to one another in the frequency domain. A high data rate signal is effectively transmitted as a set of parallel low data rate signals, each one being carried over a separate subchannel. OFDM addresses a problem known as multipath caused by differences in delay time among different paths taken from a transmitter to a receiver. The effect of multipath is intersymbol interference created by energy associated with different symbols sharing a common arrival time. By creating multiple low data rate subchannels, OFDM lengthens the period occupied by a single symbol so that dispersive effects tend to be confined within a single symbol period, thereby reducing intersymbol interference. It would also be desirable to optimize a soft decision output spatial processor to operate in conjunction with OFDM.

SUMMARY OF THE INVENTION

A spatial processor that exploits signals that arrive via multiple outputs of a communication channel to provide soft decision values useful to a trellis or Viterbi decoder is provided by virtue of the present invention. A spatial processor according to the present invention may take into account a statistical characterization of interference as received via the multiple channel outputs. Spatial processor operation may also be optimized to operate in conjunction with orthogonal frequency division multiplexing (OFDM) and thereby effectively ameliorate the effects of frequency selective interference.

In accordance with a first aspect of the present invention, a method is provided for receiving an OFDM signal via a plurality of outputs of a channel in the presence of noise and/or interference. The method includes: forming an estimate of a received OFDM frequency domain symbol based on a statistical characterization of noise and/or interference received via the plurality of channel outputs, obtaining a channel confidence level for a frequency subchannel of the OFDM frequency domain symbol, and obtaining cost metric values for various possible values of the received OFDM frequency domain symbol based on the estimate and the channel confidence level.

A further understanding of the nature and advantages of the inventions herein may be realized by reference to the remaining portions of the specification and the attached drawings.

DESCRIPTION OF SPECIFIC EMBODIMENTS

The present invention will now be described with reference to a wireless communication system that employs multiple antennas at a receiver. According to the present invention, the communication system need not be wireless and the antennas referred to herein are merely examples of connections to outputs of a communication channel.

The present invention is also described in the context of the use of OFDM (Orthogonal Frequency Division Multiplexing) for communication, although the present invention is not limited to OFDM. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an IFFT is applied to a series of frequency domain symbols to be simultaneously transmitted, a "burst." The resulting series of time domain symbols is augmented with a cyclic prefix prior to transmission. The cyclic prefix addition process can be characterized by the expression:

$$[z(1) \cdots z(N)]^T \mapsto [z(N-v+1) \cdots z(N)\ z(1) \cdots z(N)]^T$$

On the receive end, the cyclic prefix is removed from the received time domain symbols. An FFT is then applied to recover the simultaneously transmitted frequency domain symbols. The cyclic prefix has length v where v is greater than or equal to a duration of the impulse response of the overall channel and assures orthogonality of the frequency domain subchannels.

There are other ways of simultaneously transmitting a burst of symbols in orthogonal channels or substantially orthogonal channels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels. The term frequency domain should be understood to refer to any domain that is divided into such orthogonal or substantially orthogonal subchannels.

Figure 1:
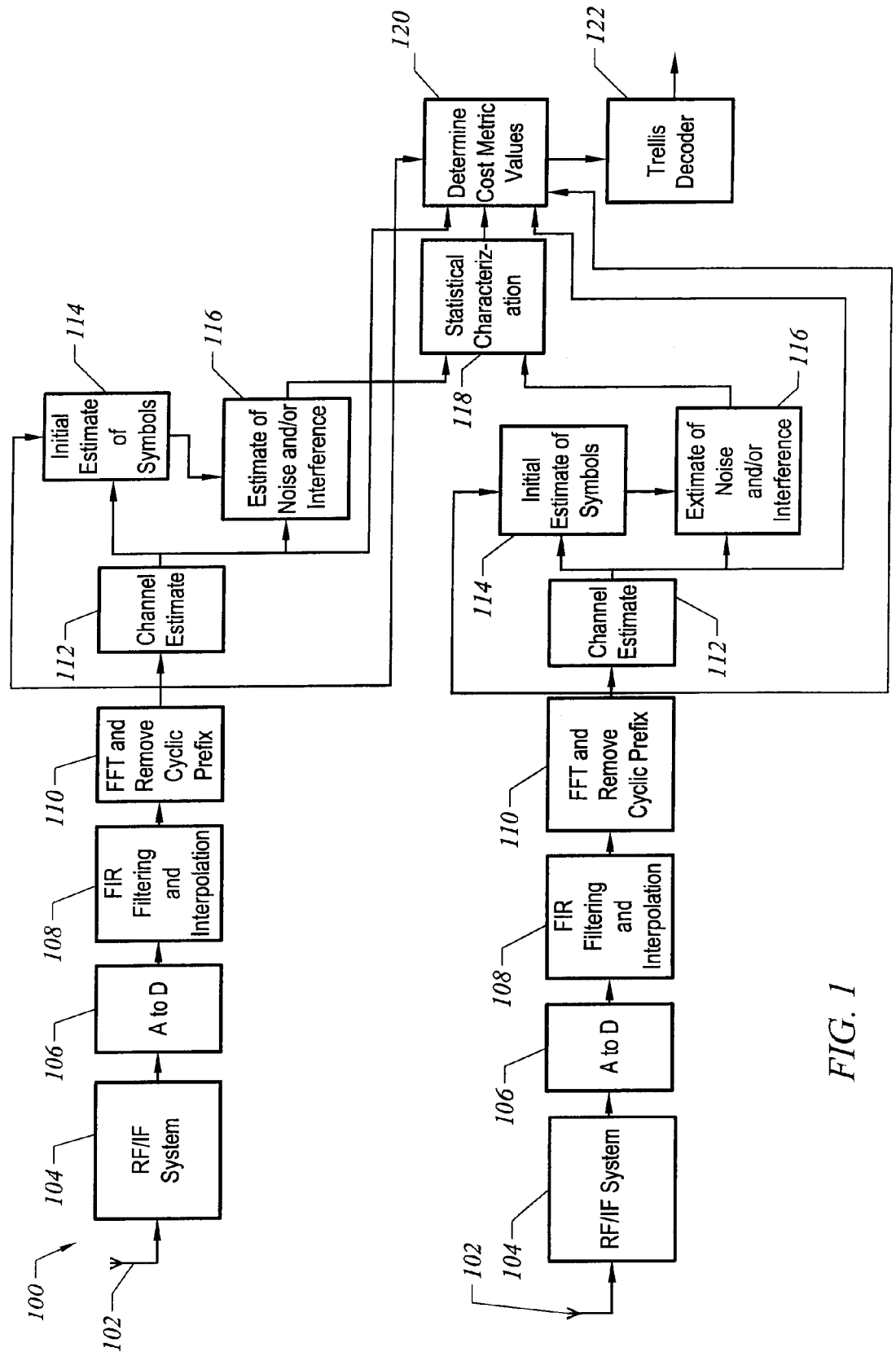
FIG. 1. depicts elements of a receiver system according to one embodiment of the present invention.

FIG. 1. depicts elements of a receiver system 100 according to one embodiment of the present invention. Receiver system 100 collects signals from a plurality of antennas 102. In FIG. 1, two antennas are shown, although any number of antennas may be used. Many components depicted in FIG. 1 are duplicated for each antenna.

Each antenna 102 is coupled to an RF/IF system 104 which performs initial analog filtering and amplification prior to downconversion to an intermediate frequency (IF) where further filtering and signal conditioning may be performed. The signal is then converted to baseband for input to an analog to digital converter 106. Alternatively, analog to digital conversion may occur at the IF. Further filtering and interpolation occurs in an FIR filter block 108. The next stage is an FFT processor 110 that removes the cyclic prefix from N+v long time domain symbol bursts and then applies the FFT to recover N frequency domain symbols for each successive OFDM burst.

Spatial processing according to one embodiment of the present invention depends on estimating the response of the channel for every frequency domain subchannel n among N frequency domain symbols. This is the function of a channel estimation processor 112. In one embodiment, at least v of the N frequency domain symbols are training symbols having known transmitted values. The received values of these training symbols are used to determine the channel response over the entire available frequency domain channel. Details of channel estimation techniques are described in WO98/09385 and in co-filed U.S. patent application Ser. No. 09/234,929, titled IMPROVED OFDM CHANNEL IDENTIFICATION, the contents of which are herein incorporated by reference.

A symbol estimation block 114 forms an initial estimate of the value of each transmitted symbol based on the output of FFT processor 110 and channel estimation processor 112. By subtracting the received value of each symbol from the transmitted value, a noise and interference estimation block 116 estimates the noise and interference at each frequency domain position independently for each antenna. Details of the operation of symbol estimation block 114 and noise and interference estimation block 116 will be discussed in greater detail with reference to FIG. 2.

A statistical characterization block 118 uses inputs from the various noise and interference estimation blocks to develop a statistical characterization of the received noise and interference and its distribution among the antennas. This statistical characterization is preferably developed independently for each frequency domain position n. It is useful to smooth over n to estimate noise and/or interference that varies over time. A cost metric value processor 120 weights inputs as received via the various antennas according to the statistical characterization of noise and interference determined by noise and interference estimation block 116. The output of cost metric value processor 120 is one or more values which constitute a so-called soft decision value for each frequency domain symbol received. In one embodiment, these values are given for each bit that makes up a symbol. Details of operation of statistical characterization block 118 and cost metric value processor block 120 are discussed in greater detail in reference to FIG. 3.

Figure 2:
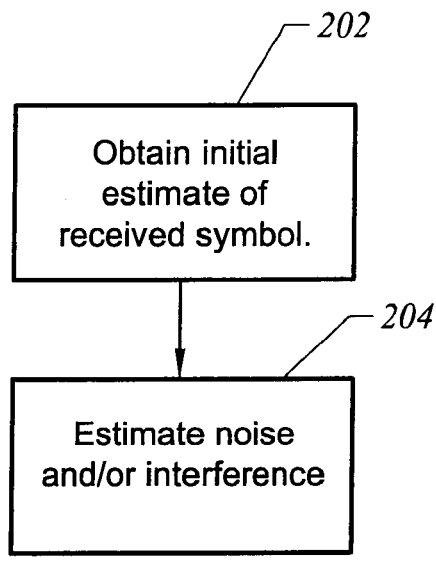
FIG. 2 is a flowchart describing steps of estimating noise and interference on a per channel output basis according to one embodiment of the present invention.

FIG. 2 is a flowchart describing steps of estimating noise and interference on a per antenna basis according to one embodiment of the present invention. The steps of FIG. 2 are performed independently for each frequency domain symbol for each antenna and are repeated for each burst. At step 202, symbol estimation block 114 forms an initial estimate, $\hat{z}_i(n)$, of the value of the symbol according to the following expression:

$$\hat{z}_i(n) = \frac{\hat{h}_i^*(n)x_i(n)}{\hat{h}_i^*(n)\hat{h}_i(n)} \text{ where}$$

n is a frequency domain index, i identifies a particular antenna, $\hat{h}_i(n)$ is a channel response estimate at frequency domain index n based on signal received via channel output i, $x_i(n)$ represents a received frequency domain symbol at frequency domain index n received via antenna i. These quantities are complex scalars. The effect of step 202 is to compensate for the known effect of the channel.

At step 204, noise and interference estimation block 116 forms an estimate of noise and interference according to the following expression:

$$\hat{w}_i(n) = x_i(n) - \hat{h}_i(n)\hat{z}_i(n)$$

where $z_i(n)$ is the nearest constellation value to the initial symbol estimate, $\hat{z}_i(n)$. In the absence of interference, noise will dominate this expression.

Figure 3:
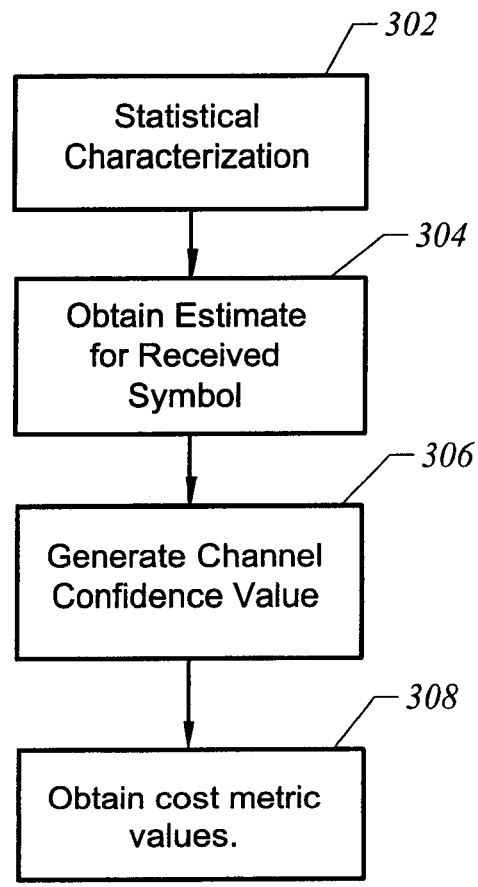
FIG. 3 is a flowchart describing steps of generating cost metric values according to one embodiment of the present invention.

FIG. 3 is a flowchart describing steps of generating cost metric values according to one embodiment of the present invention. At step 302, statistical characterization block 118 develops a statistical characterization of the received noise and interference and its distribution among the antennas. In one embodiment, it obtains a covariance matrix $R_w(n)$ that has $M_R \times M_R$ entries where $M_R$ is the number of receiver antennas. The i,jth entry of this covariance matrix is determined as $E[\hat{w}_i(n)\hat{w}^*_j(n)]$ where i and j identify individual antennas.

The E expectation operator may be evaluated over a moving series of bursts. Smoothing may be performed over either or both of time and frequency depending on interference characteristics. Cost metric value processor 120 bases its generation of cost metric values on the following expression which gives a maximum likelihood hard decision value for each frequency domain symbol:

$$\min_{Z(n)} \hat{H}^*(n)R_w^{-1}(n)\hat{H}(n)\left|z(n) - \frac{\hat{H}^*(n)R_w^{-1}(n)X(n)}{\hat{H}^*(n)R_w^{-1}(n)\hat{H}(n)}\right|^2$$

where n is a frequency domain index, $\hat{H}$ is an $M_R$ length vector estimate of a response of the channel made up of the scalar values generated by channel estimation processors 112, $R_w$ is the $M_R \times M_R$ matrix described above indicating spatial covariance of noise and/or interference, and X is an $M_R$ length vector of received symbols made up of scalar values generated by each FFT processor 110.

An alternative cost function that provides the same result is:

$$\min_{z(n)} \left\| R_w^{-1/2}(X(n) - \hat{H}(n)z(n)) \right\|_2^2$$

A cost function associated with this maximum likelihood expression may be generated in two steps. At step 304, cost metric value processor 120 generates a complex scalar estimate for the transmitted symbol at a given frequency index by applying the expression:

$$\hat{z}(n) = \frac{\hat{H}^*(n)R_w^{-1}(n)X(n)}{\hat{H}^*(n)R_w^{-1}(n)\hat{H}(n)}.$$

Unlike the estimate obtained by symbol estimation block 114, this estimate incorporates a weighting among all the antennas that optimizes the signal to noise plus interference ratio of the combined estimate. At step 306, cost metric value processor block 120 determines a scalar channel confidence level for each frequency domain subchannel by applying the expression:

$$p(n) = \hat{H}^*(n)R_w^{-1}(n)\hat{H}(n).$$

Incorporating this confidence level into cost metric evaluations allows the decoding process that follows to effectively give greater weight to symbols received via subchannels that have higher signal to noise plus interference ratios.

At step 308, cost metric value processor block 120 determines the cost metric value for each frequency domain symbol for every burst. In one embodiment, this cost metric value is given for each symbol z(n) as a whole by the expression:

$$c(n) = p(n)|z(n) - \hat{z}(n)|^2.$$

Figure 4:
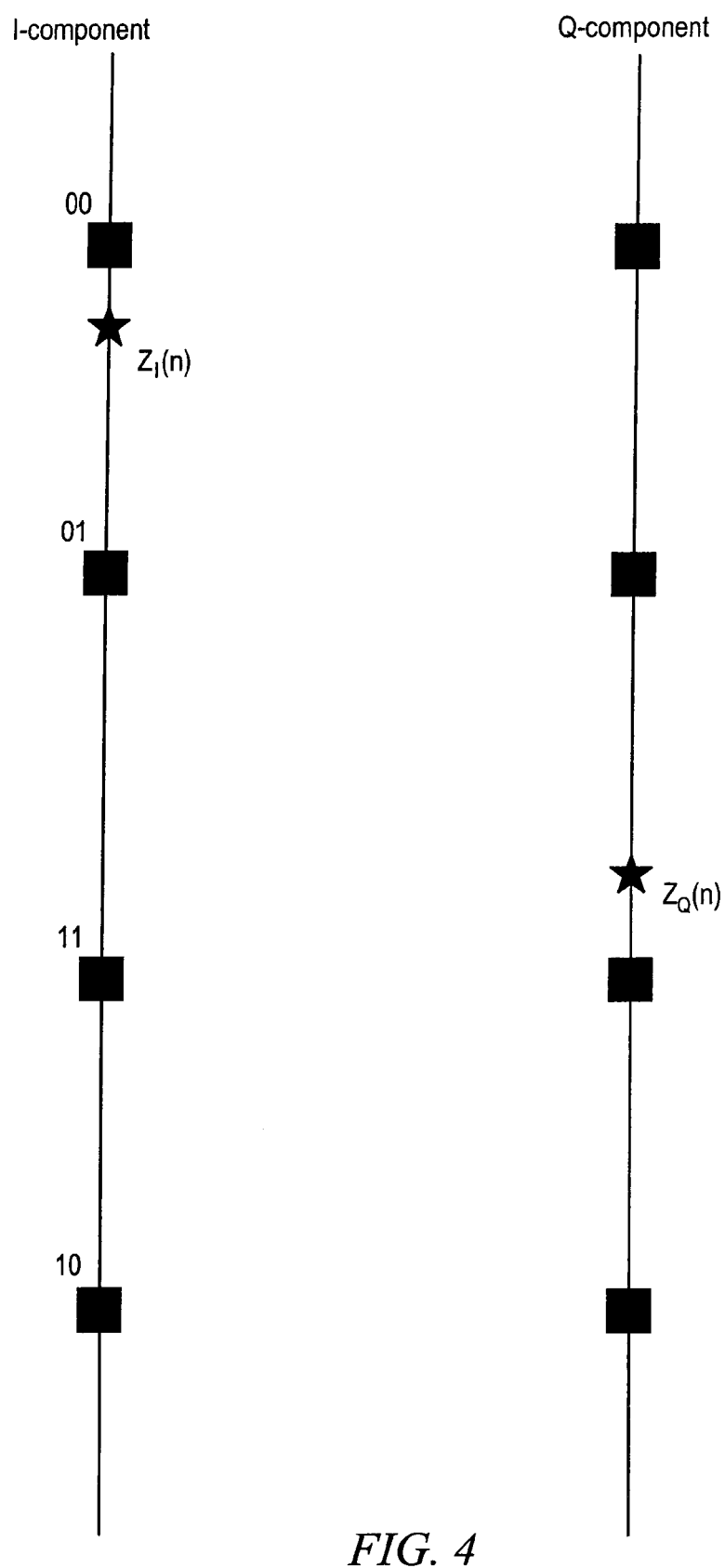
FIG. 4 depicts the operation of constellation bit mapping according to one embodiment of the present invention.

This type of cost metric value referred to in the art as "weighted Euclidean." These symbol cost metrics are used by a complex trellis decoder to remove the effects of convolutional or trellis coding. In an alternative embodiment, constellation-bit-mapping (CBM) is employed so that cost metric values are generated for each constituent bit of a symbol. This allows the use of more efficient and simpler bit-wise Viterbi decoding techniques. For CBM, the expression applied at step 304 is resolved into I and Q (i.e., real and imaginary) components $\hat{z}_I(n)$ and $\hat{z}_Q(n)$. The .CBM scheme will be explained with reference to a representative modulation scheme where the frequency domain symbols may take on one of 16 ideal complex values when transmitted (16-QAM) and thus each symbol carries four bits of information. A single 16-QAM symbol may also be understood to be a pair of symbols that each can take on one of four real values (4-PAM) and thus carries two bits of information. FIG. 4 depicts first and second PAM constellations corresponding to the I and Q components of a 16-QAM constellation along with representative positions for $\hat{z}_I(n)$ and $\hat{z}_Q(n)$.

The cost metric values are determined separately for each I and Q component and for each bit. Thus for each frequency domain symbol, there are four associated cost values. The cost metric value is given independently for I and Q components by the expression:

$$c(n, m) = p(n)|d_0(n, m) - d_1(n, m)|^2$$

where n is the frequency domain index, m identifies a particular bit in the PAM symbol, and p(n) is the confidence level determined at step 306. $d_0(n,m)$ is the distance from the relevant component of $\hat{z}$ (n) to the nearest ideal PAM constellation symbol position having the value "0" at bit position m. Similarly, $d_1(n,m)$ is the distance to the nearest ideal constellation symbol position having the value "1" at bit position m. In FIG. 4, for the I-component for the MSB bit position, $d_0(n,2)$ is the distance from $\hat{z}_I(n)$ to the ideal symbol position having value 00. $d_1(n,2)$ is the distance from $\hat{z}_I(n)$ to the ideal symbol position having value 11. For the LSB bit position, $d_0(n,1)$ is the distance from $\hat{z}_I(n)$ to the ideal symbol position having value 00. $d_1(n,1)$ is the distance from $\hat{z}_I(n)$ to the ideal symbol position having value 01. These CBM calculations maybe performed by a lookup table having as inputs p(n) and either $\hat{z}_I(n)$ or $\hat{z}_Q(n)$. The outputs are then the metric values for input to decoder 122.

The spatial processing techniques described above may be simplified by assuming that the interference is spatially uncorrelated among the various receiver antennas. Under this assumption, $$R_w(n) = \begin{bmatrix} \sigma_1^2(n) & 0 \\ 0 & \sigma_2^2(n) \end{bmatrix}$$

for a two receiver antenna system.

Step 304 then becomes obtaining $$\hat{z}(n) = \frac{\sum_{i=1}^{M_R} \hat{h}_i^*(n) / \sigma_i^2(n) x_i(n)}{\sum_{i=1}^{M_R} |\hat{h}_i(n)|^2 / \sigma_i^2(n)}$$

and step 306 becomes obtaining $$p(n) = \sum_{i=1}^{M_R} |\hat{h}_i(n)|^2 / \sigma_i^2(n).$$

The various noise and interference estimation blocks 116 need only find interference energy for each tone and antenna. One technique is to find the so-called "constellation variance" by applying the expression:

$$\sigma_i^2(n) = E\{\hat{h}_i^*(n)\hat{h}_i(n)|\hat{z}_i(n) - z(n)|^2\} \text{ where}$$

where z(n) is the nearest ideal constellation value and $\hat{z}_i(n)$ is the single antenna corrected symbol value:

$$\hat{z}_i(n) = \frac{\hat{h}_i^*(n)x_i(n)}{\hat{h}_i^*(n)\hat{h}_i(n)}$$

found by symbol estimation block 114. This process of finding constellation variances substitutes for step 302.

One may further simplify implementation of spatial processing according to the present invention by assuming that interference is not only spatially uncorrelated across antennas but also identically distributed. This means that $R_w(n) = \sigma^2(n)I_{M_R}$ where $\sigma^2$ is the identical interference energy level at each antenna and where $I_{M_R}$ is the $M_R \times M_R$ identity matrix. Then step 304 becomes obtaining:

$$\hat{z}(n) = \frac{\sum_{i=1}^{M_R} \hat{h}_i^*(n)x_i(n)}{\sum_{i=1}^{M_R} |\hat{h}_i(n)|^2}.$$

At step 306, the channel confidence level is determined to be:

$$p(n) = \frac{1}{\sigma^2(n)} \sum_{i=1}^{M_R} |\hat{h}_i(n)|^2.$$

Step 302 becomes finding the interference energy at tone n, $\sigma^2(n)$, the average constellation variance obtained by:

$$\sigma^2(n) = E\left\{\sum_{i=1}^{M_R} |\hat{h}_i(n)|^2 |\hat{z}(n) - z(n)|^2\right\}.$$

Because the estimated channel value $\hat{H}(n)$ is also corrupted by interference, it can be beneficial to average the channel confidence value p(n) by instead obtaining:

$$p(n) = \frac{1}{E\{|\hat{z}(n) - z(n)|^2\}},$$

where, again, z(n) is the nearest ideal constellation value to $\hat{z}(n)$ which is given by step 304 as calculated according to the iid assumption.

It is sometimes useful to consider the inverse of the channel confidence level to be another measure of interference energy:

$$q(n) = \frac{1}{p(n)} = E\{|\hat{z}(n) - z(n)|^2\}.$$

It is also often useful to smooth interference energy across frequency or over successive bursts as part of the spatial processing. This smoothing may be applied to any of the quantitities: $\sigma^2(n)$, $\sigma_I^2(n)$, $R_w(n)$, or q(n). For this discussion of smoothing, all of these quantities will be referred to as r(n,k) at tone n and burst k.

One way to smooth is to use a square window across M frequency positions by obtaining:

$$\bar{r}(n, k) = \frac{1}{M} \sum_{m=n-M/2}^{n+M/2} r(m, k),$$

$\forall$n. The information carried by the quantity r(n,k) can also be compressed to fewer than v values since interference tends to pollute contiguous sets of tones. One may for example obtain interference averages for each group of seven tones using the expression:

$$\bar{r}(n, k) = \frac{1}{7} \sum_{m=n-3}^{n+3} r(m, k), \quad \forall n \in \{4, 12, 20 \ldots\}.$$

Also, one can smooth over successive bursts. For example, one may use an exponential window to incorporate values of previous bursts by applying the expression:

$$\bar{r}(n, k) = \beta\bar{r}(n, k-1) + (1-\beta)r(n, k).$$

If $r(n, k) = R_w(n, k)$, exponential averaging from burst to burst may be applied as:
$R_w(n, k) = \beta R_w(n, k-1) + (1-\beta)w(n,k)w^*(n,k)$. A representative value of $\beta$ is, e.g., 15/16.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, all formulas given above are merely representative of procedures that may be used. Functionality may be added or deleted from FIG. 1 and operations may be interchanged among functional blocks. For the flowchart of FIGS. 2–3, steps may be added or deleted within the scope of the present invention. All publications, patents, and patent applications cited herein are hereby incorporated by reference.

What is claimed is:

1. In a digital communication system, apparatus for receiving an OFDM signal via a plurality of outputs of a channel in the presence of noise and/or interference, said apparatus comprising:

means for forming an estimate of a received OFDM frequency domain symbol based on a statistical characterization of noise and/or interference received via said plurality of channel outputs;

means for obtaining a channel confidence level for a frequency subchannel of said OFDM frequency domain symbol; and means for obtaining a cost metric value of said received OFDM frequency domain symbol based on said estimate and said channel confidence level.

2. The apparatus of claim 1 wherein said means for forming said estimate comprises means for obtaining:

$$\hat{z}(n) = \frac{\hat{H}^*(n)R_w^{-1}(n)X(n)}{\hat{H}^*(n)R_w^{-1}(n)\hat{H}(n)}$$

wherein n is a frequency domain index for said symbol, $\hat{H}$ is an $M_R$ length vector estimate of a response of said channel where $M_R$ is a number of said multiple outputs, $R_W$ is an $M_R \times M_R$ matrix indicating spatial covariance of noise and/or interference, and X is an $M_R$ length vector of received symbols.

3. The apparatus of claim 2 wherein said means for obtaining said channel confidence level comprises means for obtaining:

$p(n) = \hat{H}^*(n)R_w^{-1}(n)\hat{H}(n).$

4. The apparatus of claim 1 further comprising:

means for using said cost metric values in a trellis decoding process.

5. The apparatus of claim 4 wherein said cost metric values are obtained for each bit of said OFDM frequency domain symbol.

6. The apparatus of claim 1 wherein said statistical characterization assumes that said interference is spatially uncorrelated among said channel outputs.

7. The apparatus of claim 6 wherein said means for forming said estimate comprises means for obtaining:

$$\hat{z}(n) = \frac{\sum_{i=1}^{M_R} \hat{h}_i^*(n)/\sigma_i^2(n)x_i(n)}{\sum_{i=1}^{M_R} |\hat{h}_i(n)|^2 /\sigma_i^2(n)}; \text{ and}$$

wherein said means for obtaining said channel confidence level comprises means for obtaining:

$$p(n) = \sum_{i=1}^{M_R} |\hat{h}_i(n)|^2 /\sigma_i^2(n); \text{ and wherein}$$

n is a frequency domain index for said symbol, i identifies a particular one of $M_R$ channel outputs, $\hat{h}_i$ is the channel response measured at output i, $x_i$ is the frequency domain symbol received at channel output i, and $\sigma_i^2$ is a signal variance as received via a channel output i.

8. The apparatus of claim 1 wherein said statistical characterization assumes that said interference is spatially uncorrelated and identically distributed among said channel outputs.

9. The apparatus of claim 8 wherein said means for forming said estimate comprises means for obtaining:

$$\hat{z}(n) = \frac{\sum_{i=1}^{M_R} \hat{h}_i^*(n)x_i(n)}{\sum_{i=1}^{M_R} |\hat{h}_i(n)|^2}; \text{ and}$$

wherein obtaining said channel confidence level comprises obtaining:

$$p(n) = \frac{1}{\sigma^2(n)}\sum_{i=1}^{M_R} |\hat{h}_i(n)|^2; \text{ and wherein}$$

n is a frequency domain index for said symbol, i identifies a particular one of $M_R$ channel outputs, $\hat{h}_i$ is the channel response measured at output i, $x_i$ is the frequency domain symbol received at channel output i, and $\sigma^2$ is an overall signal variance.

10. The apparatus of claim 1 wherein said statistical characterization is obtained based on noise plus interference estimates obtained independently for each of said channel outputs.

11. The apparatus of claim 10 wherein said means for forming an estimate comprises:

means for obtaining an initial estimate of said frequency domain symbol to be:

$$\hat{z}_i(n) = \frac{\hat{h}_i^*(n)x_i(n)}{\hat{h}_i^*(n)\hat{h}_i(n)}$$

means for obtaining a noise and interference estimate for each channel output i and for said frequency index n to be:

$$\hat{w}_i(n) = x_i(n) - \hat{h}_i(n)\hat{z}_i(n); \text{ and}$$

means for obtaining an ijth entry of a covariance matrix $R_w(n)$ to be $E[\hat{w}_i(n)\hat{w}^*_j(n)]$; and wherein n is a frequency domain index, i and j identify particular channel outputs, $\hat{h}_i(n)$ is a channel response estimate at frequency domain index n based on signal received via channel output i, $x_i(n)$ represents a received frequency domain symbol at frequency domain index n received via channel output i.

12. The apparatus of claim 11 wherein said multiple channel outputs comprise multiple antennas.

13. In a digital communication system, a method for receiving an OFDM signal via a plurality of outputs of a channel in the presence of noise and/or interference, the method comprising:

forming estimates of received OFDM frequency domain symbols based on a statistical characterization of noise and/or interference received via said plurality of channel outputs;

obtaining channel confidence levels for frequency subchannels corresponding to said OFDM frequency domain symbols; and decoding said OFDM signal using said channel confidence levels and said estimates.

14. The method of claim 13 wherein using comprises:

using a trellis decoding process.

15. In a digital communication system, apparatus for receiving an OFDM signal via multiple outputs of a channel in the presence of noise and/or interference, the apparatus comprising:

an estimation block that forms a statistical characterization of noise and/or interference received via said plurality of channel outputs;

a cost metric value processing block that:

forms estimates of received OFDM frequency domain symbols based on said statistical characterization; and obtains channel confidence levels for frequency subchannels of said OFDM frequency domain symbol; and a decoder that decodes said OFDM signal based on said channel confidence levels and said estimates.

16. The apparatus of claim 15 wherein said decoder comprises:

a trellis decoder.

* * * * *